United States Patent
Kuwahara et al.

(10) Patent No.: US 8,508,867 B2
(45) Date of Patent: Aug. 13, 2013

(54) LENS BARREL

(75) Inventors: Takumi Kuwahara, Nara (JP); Tetsuya Uno, Osaka (JP)

(73) Assignee: Panasonic Corporation, Osaka (JP)

( * ) Notice: Subject to any disclaimer, the term of this patent is extended or adjusted under 35 U.S.C. 154(b) by 72 days.

(21) Appl. No.: 13/159,354

(22) Filed: Jun. 13, 2011

(65) Prior Publication Data

US 2011/0304932 A1    Dec. 15, 2011

(30) Foreign Application Priority Data

Jun. 14, 2010    (JP) ................................. 2010-134770

(51) Int. Cl.
*G02B 7/02*    (2006.01)

(52) U.S. Cl.
USPC ......................................... 359/819; 359/694

(58) Field of Classification Search
USPC ......................................... 359/819
See application file for complete search history.

(56) References Cited

U.S. PATENT DOCUMENTS

| 5,581,412 A |    | 12/1996 | Tanaka |
|---|---|---|---|
| 5,822,626 A | * | 10/1998 | Kosako ........................... 396/84 |
| 8,014,082 B2 | * | 9/2011 | Nishikawa et al. ........... 359/738 |
| 2004/0042090 A1 |    | 3/2004 | Nomura |

FOREIGN PATENT DOCUMENTS

| JP | 63-39217 | 3/1988 |
|---|---|---|
| JP | 04-257834 | 9/1992 |
| JP | 07-191251 | 7/1995 |
| JP | 2000-029125 | 1/2000 |
| JP | 2003-186096 | 7/2003 |
| JP | 2005-221959 | 8/2005 |
| JP | 2006-091311 | 4/2006 |
| JP | 2006-215421 | 8/2006 |
| JP | 2007-047542 A | 2/2007 |
| JP | 2008-015391 | 1/2008 |

* cited by examiner

*Primary Examiner* — James Jones
(74) *Attorney, Agent, or Firm* — Renner, Otto, Boisselle & Sklar, LLP

(57) ABSTRACT

A lens barrel includes an optical imaging system having an optical axis and forming an optical image of an object. The lens barrel further includes a frame including a wall extending in the optical axis direction; an electronic component provided in the frame; and a flexible cable electrically connected to the electronic component. An opening is formed in the wall. The flexible cable covers at least a part of the opening to block a light passage through the opening.

3 Claims, 9 Drawing Sheets

LENS BARREL

CROSS-REFERENCE TO RELATED APPLICATION

This application claims priority to Japanese Patent Application No. 2010-134770 filed on Jun. 14, 2010, , the entire disclosure of which is incorporated by reference herein. In addition, this application is related to Japanese Patent Publication No. 2011-128462 filed on Jun. 8, 2011, the entire disclosure of which is incorporated by reference herein.

BACKGROUND

The present disclosure relates to a lens barrel.

An imaging device such as a digital still camera etc. includes a lens barrel. The lens barrel includes an optical system, and an optical image of an object is formed on an imaging device through the optical system. In the lens barrel, when unnecessary light beams enter the imaging device, quality of an image is degraded. Thus, it is necessary to reduce the entrance of the unnecessary light beams into the imaging device.

For example, in a lens barrel of Japanese Patent Publication No. 2006-215421, a cylindrical wall extending toward an imaging device side in an optical axis direction is provided in a first group frame, thereby reducing an entrance of unnecessary light beams into the imaging device.

SUMMARY

As in the foregoing case, a cylindrical wall provided in a lens holding frame reduces reflection of unnecessary light beams inside a lens barrel. However, in a case where an electronic component such as an actuator etc. is mounted in the lens holding frame, it is necessary to provide a cable through which power is supplied to the electronic component. In such a case, it is necessary to provide an opening in a wall of the lens holding frame in order to attach the cable to the lens holding frame or improve workability of the cable attachment. If the opening is provided in the wall of the lens holding frame, unnecessary light beams may pass through the opening. As a result, there is a possibility that the unnecessary light beams enter an imaging device. In particular, if a flexible cable is used as the cable, the opening is large, and therefore the problem relating to unnecessary light beams is exacerbated.

A technique disclosed herein has been made in view of the foregoing, and it is an objective of the technique to reduce a light leakage in a configuration in which an opening for a cable attachment is provided in a frame.

The technique disclosed herein is intended for a lens barrel including an optical imaging system having an optical axis and forming an optical image of an object; a frame including a wall extending in a direction of the optical axis of the optical imaging system; an electronic component provided in the frame; and a flexible cable electrically connected to the electronic component. An opening is formed in the wall, and the flexible cable covers at least a part of the opening to block a light passage through the opening.

According to the lens barrel, the light leakage can be reduced in the configuration in which the opening for the cable attachment is provided in the frame.

DETAILED DESCRIPTION

Figure 1:
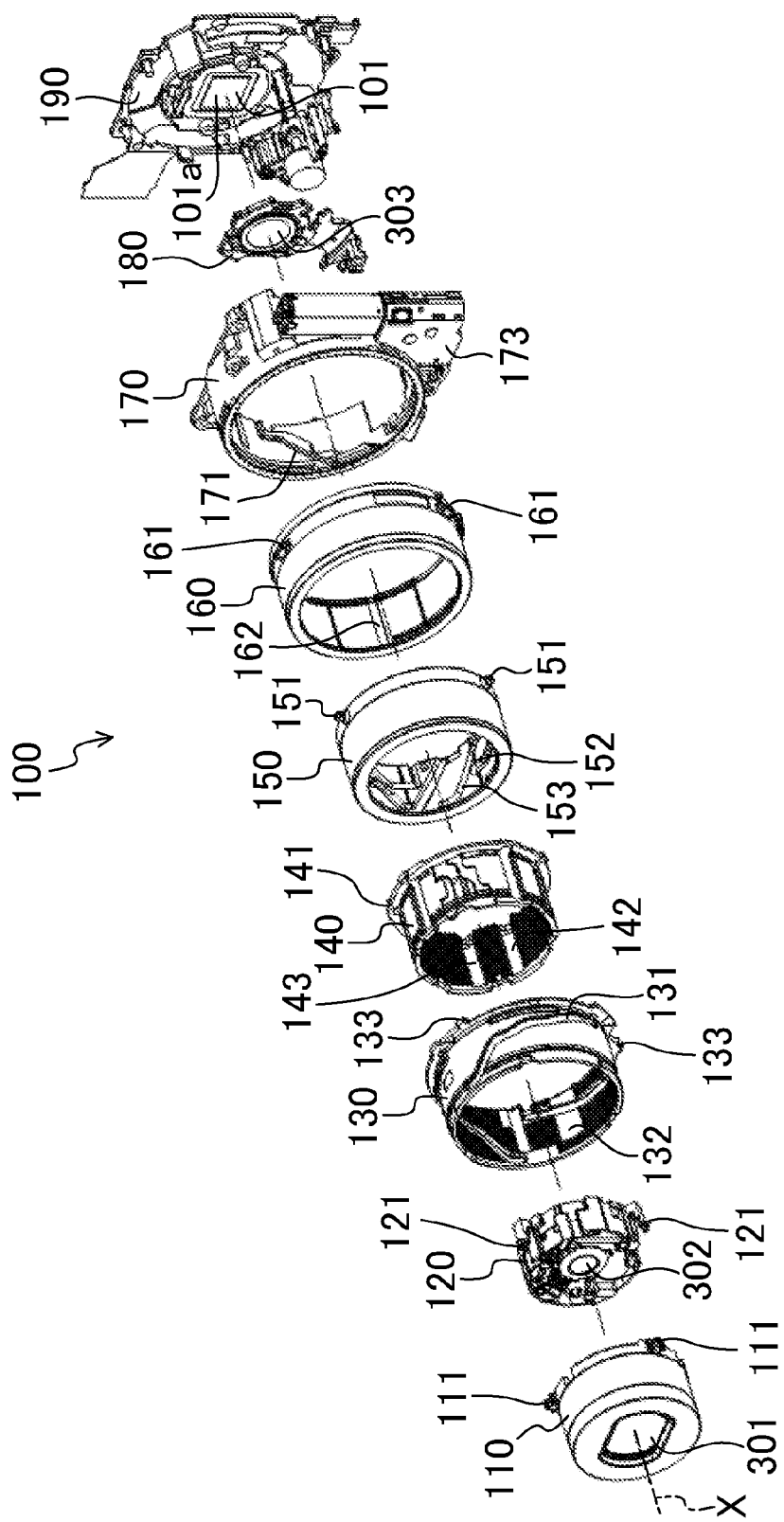
FIG. 1 is an exploded perspective view of a lens barrel of an embodiment.
Figure 2:
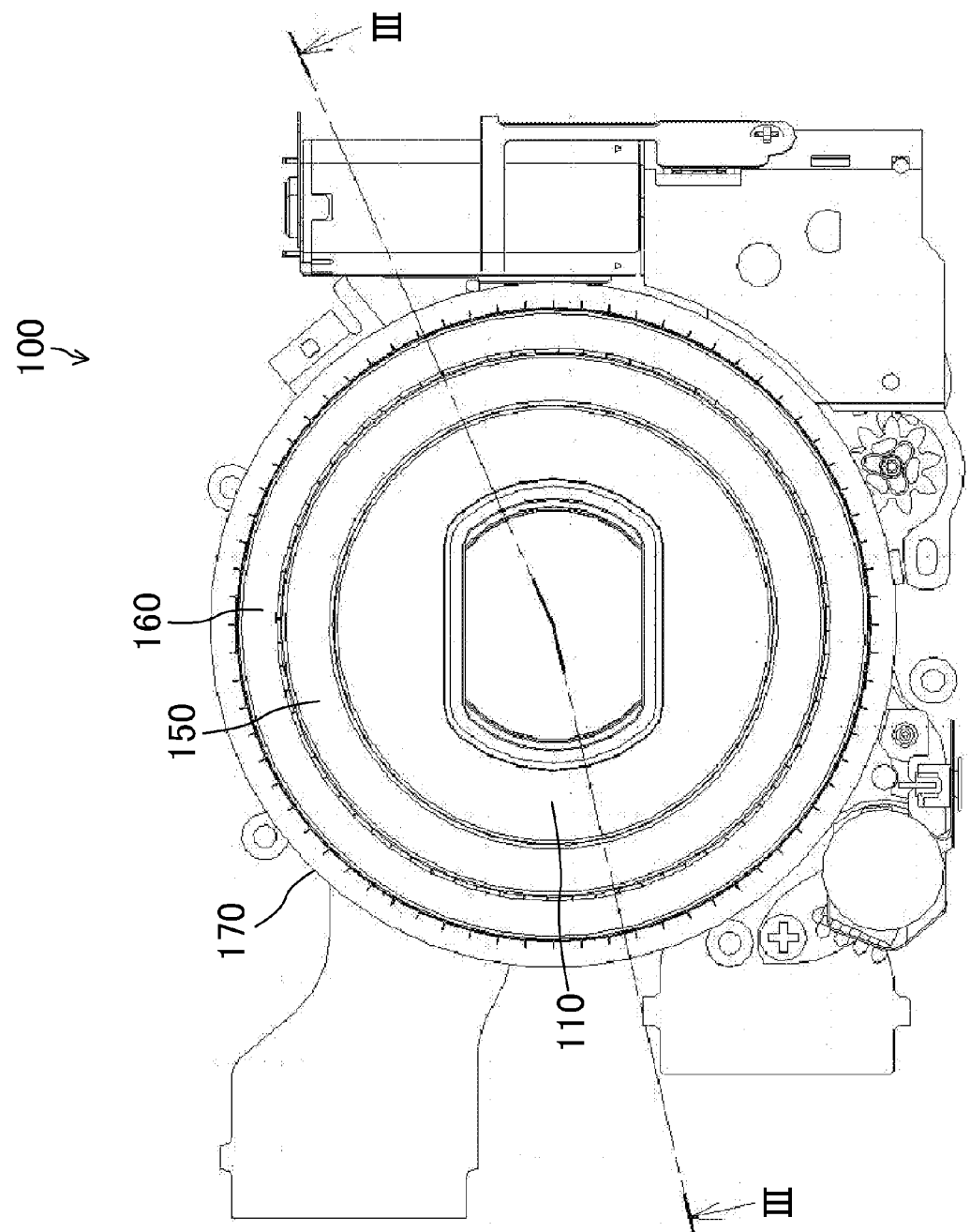
FIG. 2 is a front view of the lens barrel.
Figure 3:
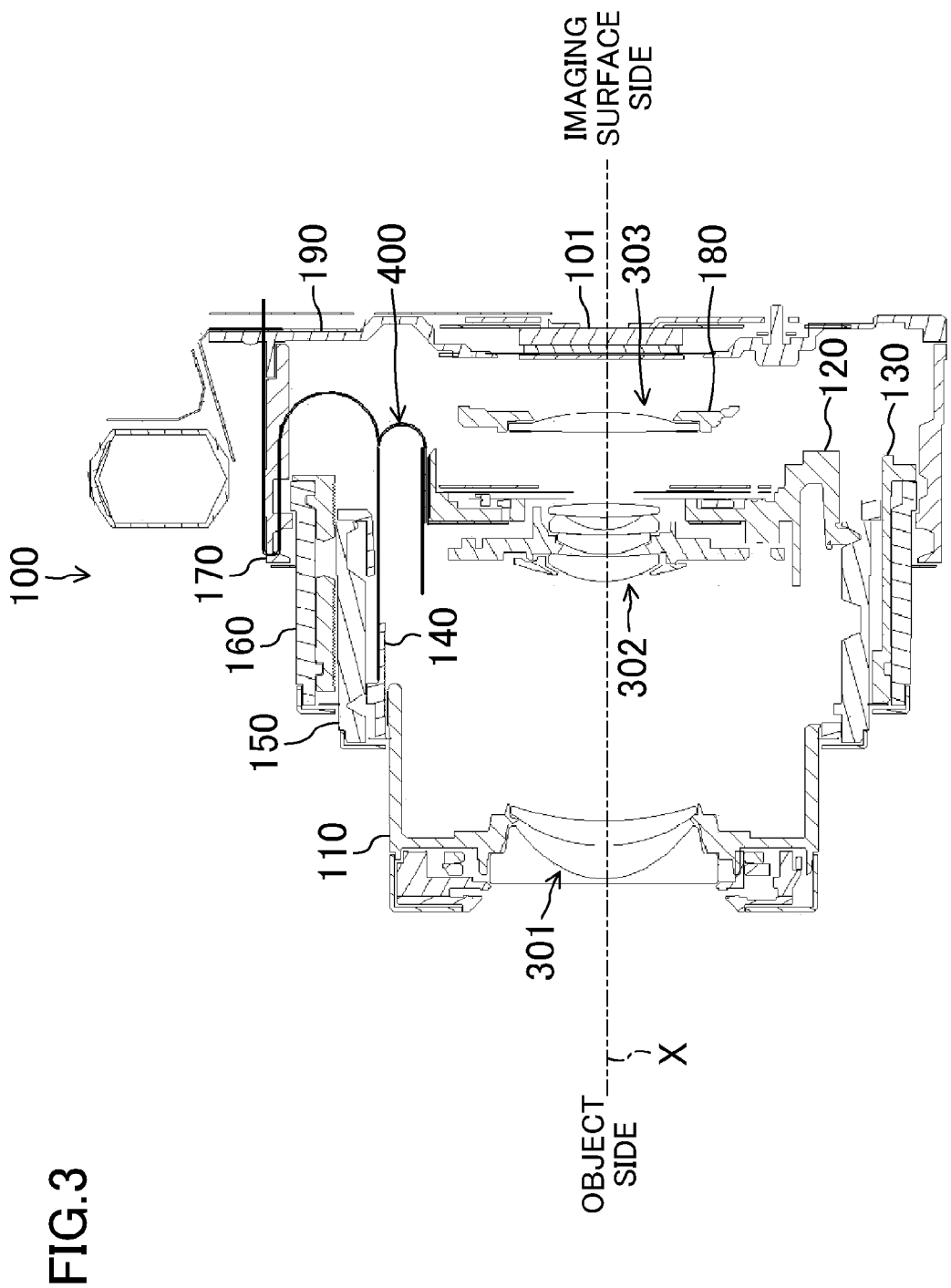
FIG. 3 is an III-III cross-sectional view of the lens barrel of FIG. 2.

Example embodiments will be described below in detail with reference to the drawings. FIG. 1 is an exploded perspective view of a lens barrel 100 of the embodiments. FIG. 2 is a front view of the lens barrel 100. FIG. 3 is an III-III cross-sectional view of the lens barrel 100 of FIG. 2.

[1. Configuration of Lens Barrel 100 ]

A lens barrel 100 of a first embodiment is mounted in a digital still camera. The lens barrel 100 includes a master flange 190, various frames which will be described below, an optical imaging system formed by lenses held by the frames, and an imaging device 101 configured to convert light entering the imaging device 101 through the optical imaging system into an electrical signal and output the electrical signal. The lens barrel 100 is one example, and can be mounted not only in the digital still camera but also in a camcorder, a camera-equipped cell-phone, etc. The optical imaging system includes a first lens group 301, a second lens group 302, and a focus lens group 303. The first lens group 301 is positioned closest to an object side. Each of the first lens group 301, the second lens group 302, and the focus lens group 303 includes one or more lenses. The optical imaging system forms an optical image of an object on an imaging surface 101a of the imaging device 101.

As the various frames, the lens barrel 100 includes a first group frame 110 holding the first lens group 301, a second group frame 120 holding the second lens group 302, a cam slot frame 130, a translational frame 140, a cam frame 150, a drive frame 160, a fixed frame 170, and a third group frame 180 holding the focus lens group 303. The first group frame 110, the second group frame 120, the cam slot frame 130, the translational frame 140, the cam frame 150, the drive frame 160, the fixed frame 170, and the third group frame 180 are concentrically arranged about an optical axis X.

The imaging device 101 is fixed to the master flange 190 so that the imaging surface 101a of the imaging device 101 faces the object side. In addition, the fixed frame 170 is fixed to the master flange 190. A fixed cam groove 171 extending in a predetermined pattern and having a bottom, and a translational groove extending in an optical axis direction (or along a direction of the optical axis X) and having a bottom are formed in an inner circumferential surface of the fixed frame 170. A zoom motor unit 173 is attached to the fixed frame 170. In the present specification, unless otherwise described, a "groove" includes a groove having a bottom and a groove not having a bottom. In addition, unless otherwise described, a "slot" means a groove not having a bottom.

A drive cam follower 161 and a gear portion are provided on an outer circumferential surface of the drive frame 160.

The drive frame 160 is housed in the fixed frame 170. In such a state, the drive cam follower 161 of the drive frame 160 is engaged with the fixed cam groove 171 of the fixed frame 170, and the gear portion of the drive frame 160 is engaged with the zoom motor unit 173. The drive frame 160 is rotatably driven about the optical axis by the zoom motor unit 173. The drive frame 160 relatively moves in the optical axis direction while rotating about the optical axis with respect to the fixed frame 170 according to the fixed cam groove 171. A circumferential groove extending in a circumferential direction and having a bottom, and a translational groove 162 extending in the optical axis direction and having a bottom are formed in an inner circumferential surface of the drive frame 160. When a term "rotate" is simply used below, it means a rotation about the optical axis.

A first engagement protrusion 133 to be engaged with the translational groove of the fixed frame 170, and a second engagement protrusion to be engaged with the circumferential groove of the drive frame 160 are provided on an outer circumferential surface of the cam slot frame 130. The cam slot frame 130 is housed in the drive frame 160. In such a state, the second engagement protrusion of the cam slot frame 130 is engaged with the circumferential groove of the drive frame 160. This allows the cam slot frame 130 to relatively rotate with respect to the drive frame 160, and not to relatively move in the optical axis direction with respect to the drive frame 160. That is, the cam slot frame 130 moves together with the drive frame 160 in the optical axis direction. The cam slot frame 130 housed in the drive frame 160 is further housed in the fixed frame 170. In such a state, the first engagement protrusion 133 is engaged with the translational groove of the fixed frame 170. Since the translational groove of the fixed frame 170 extends in the optical axis direction, the cam slot frame 130 is supported so as to move in the optical axis direction in a state in which the cam slot frame 130 cannot relatively rotate with respect to the fixed frame 170. A cam slot 131 extending in a predetermined pattern is formed in the cam slot frame 130. In addition, a translational groove 132 extending in the optical axis direction and having a bottom is formed in an inner circumferential surface of the cam slot frame 130.

Cam followers 151 are provided on an outer circumferential surface of the cam frame 150. The cam frame 150 is housed in the cam slot frame 130. In such a state, the cam followers 151 of the cam frame 150 penetrate the cam slot 131 of the cam slot frame 130, and are engaged with the translational groove 162 of the drive frame 160. In this manner, the cam frame 150 is held so as to rotate together with the drive frame 160 and translationally and relatively move in the optical axis direction with respect to the drive frame 160. In addition, the cam followers 151 are also engaged with the cam slot 131 of the cam slot frame 130. Thus, when the drive frame 160 is rotatably driven, the cam frame 150 relatively moves in the optical axis direction while relatively rotating with respect to the cam slot frame 130 according to a shape of the cam slot 131. First group cam grooves 152 each having a bottom and second group cam grooves 153 each having a bottom are provided in an inner circumferential surface of the cam frame 150. In addition, engagement protrusions are provided on the inner circumferential surface of the cam frame 150.

The translational frame 140 is housed in the cam frame 150. A circumferential groove extending in the circumferential direction and having a bottom is formed in an outer circumferential surface of the translational frame 140. The engagement protrusions of the cam frame 150 are engaged with the circumferential groove. The engagement of the engagement protrusions with the circumferential groove allows the translational frame 140 to relatively rotate with respect to the cam frame 150, and not to relatively move in the optical axis direction with respect to the cam frame 150. That is, when the cam frame 150 moves in the optical axis direction and rotates, the translational frame 140 moves together with the cam frame 150 in the optical axis direction. The translational frame 140 includes engagement protrusions 141 outwardly protruding from a rear end portion of the translational frame 140. The rear end portion of the translational frame 140 protrudes beyond the cam frame 150, and the engagement protrusion 141 is engaged with the translational groove 132 of the cam slot frame 130. The engagement of the engagement protrusion 141 with the translational groove 132 allows the translational frame 140 not to relatively rotate with respect to the cam slot frame 130. In addition, translational slots 142, 143 are formed in the translational frame 140.

The first group frame 110 includes first group cam followers 111. The first group frame 110 is housed in the translational frame 140. The first group frame 110 is engaged with the translational slots 142 of the translational frame 140. The first group frame 110 is translationally and relatively movable in the optical axis direction with respect to the translational frame 140, and does not relatively rotate with respect to the translational frame 140. The first group cam followers 111 are engaged with the first group cam grooves 152 of the cam frame 150. When the cam frame 150 rotates, the first group frame 110 relatively moves in the optical axis direction with respect to the cam frame 150 and relatively rotates with respect to the cam frame 150 through a first cam mechanism formed by the first group cam follower 111 and the first group cam groove 152.

The second group frame 120 includes second group cam followers 121. The second group frame 120 is housed in the translational frame 140. The second group frame 120 is engaged with the translational slot 143 of the translational frame 140. The second group frame 120 is translationally and relatively movable in the optical axis direction with respect to the translational frame 140, and does not relatively rotate with respect to the translational frame 140. The second group cam followers 121 are engaged with the second group cam grooves 153 of the cam frame 150. When the cam frame 150 rotates, the second group frame 120 relatively moves in the optical axis direction with respect to the cam frame 150 and relatively rotates with respect to the cam frame 150 through a second cam mechanism formed by the second group cam follower 121 and the second group cam groove 153.

The third group frame 180 is slidably engaged with a guide pole provided in the master flange 190. The third group frame 180 is driven separately from other frames in the optical axis direction by an actuator provided in the master flange 190.

The cam groove 171 of the fixed frame 170, the cam slot 131 of the cam slot frame 130, and the first group cam groove 152 and the second group cam groove 153 of the cam frame 150 are set so as to have a proper shape corresponding to a rotational angle. Thus, the first lens group 301 and the second lens group 302 can be arranged in proper positions corresponding to a rotation amount of the drive frame 160. In addition, the length of the lens barrel 100 in the optical axis direction when the lens barrel 100 is not in a shootable state (i.e., in a retracted state) can be shortened.

In the lens barrel 100 configured as described above, when the zoom motor unit 173 rotatably drives the drive frame 160, the first group frame 110 and the second group frame 120 move in the optical axis direction. This adjusts a focal distance of the zoom optical system. In addition to the foregoing, the third group frame 180 is moved to a proper position based on a distance between the object and the lens barrel 100. In such a manner, light enters the imaging device 101 to form an image on the imaging device 101, and such an image is captured.

[2. Configuration of Second Group Frame 120]

Figure 4:
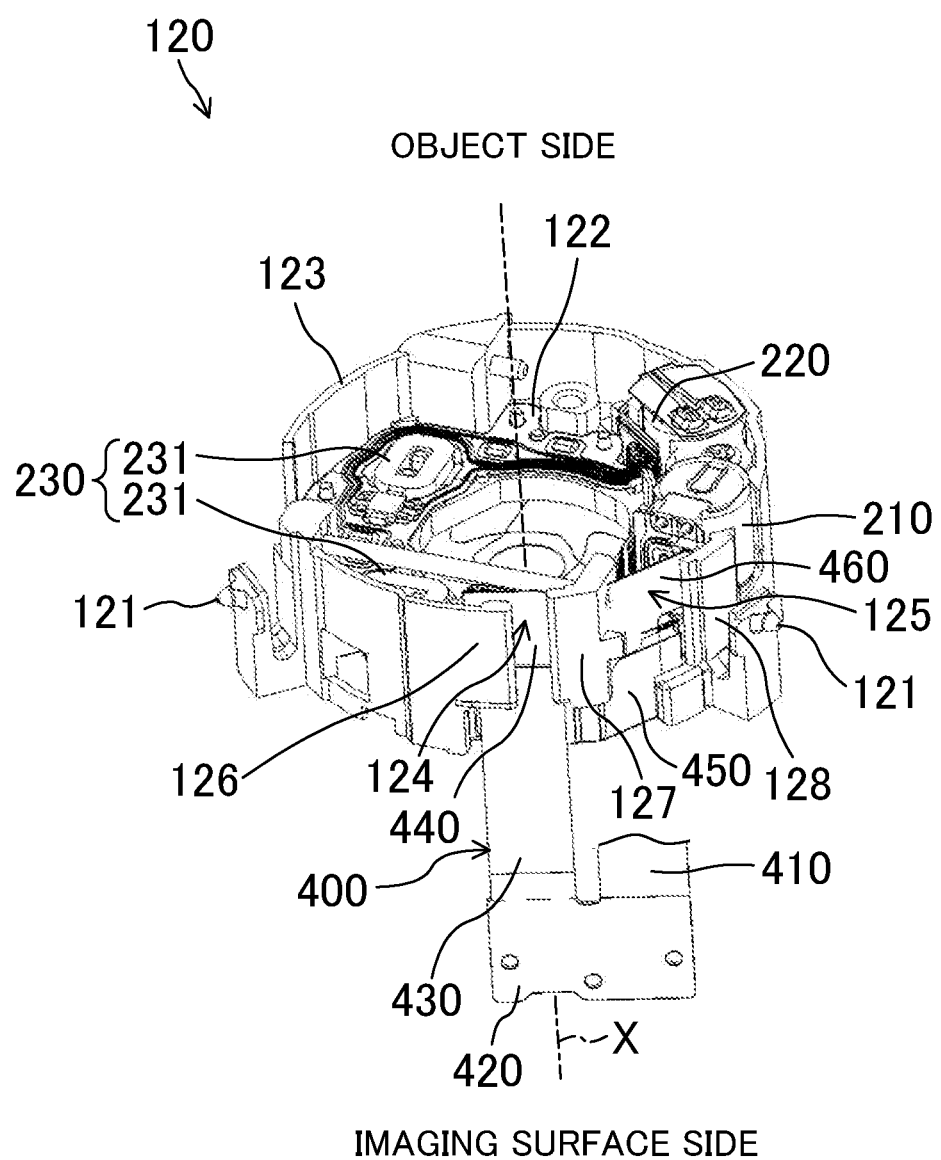
FIG. 4 is a perspective view of a second group frame to which a flexible cable is attached.
Figure 5:
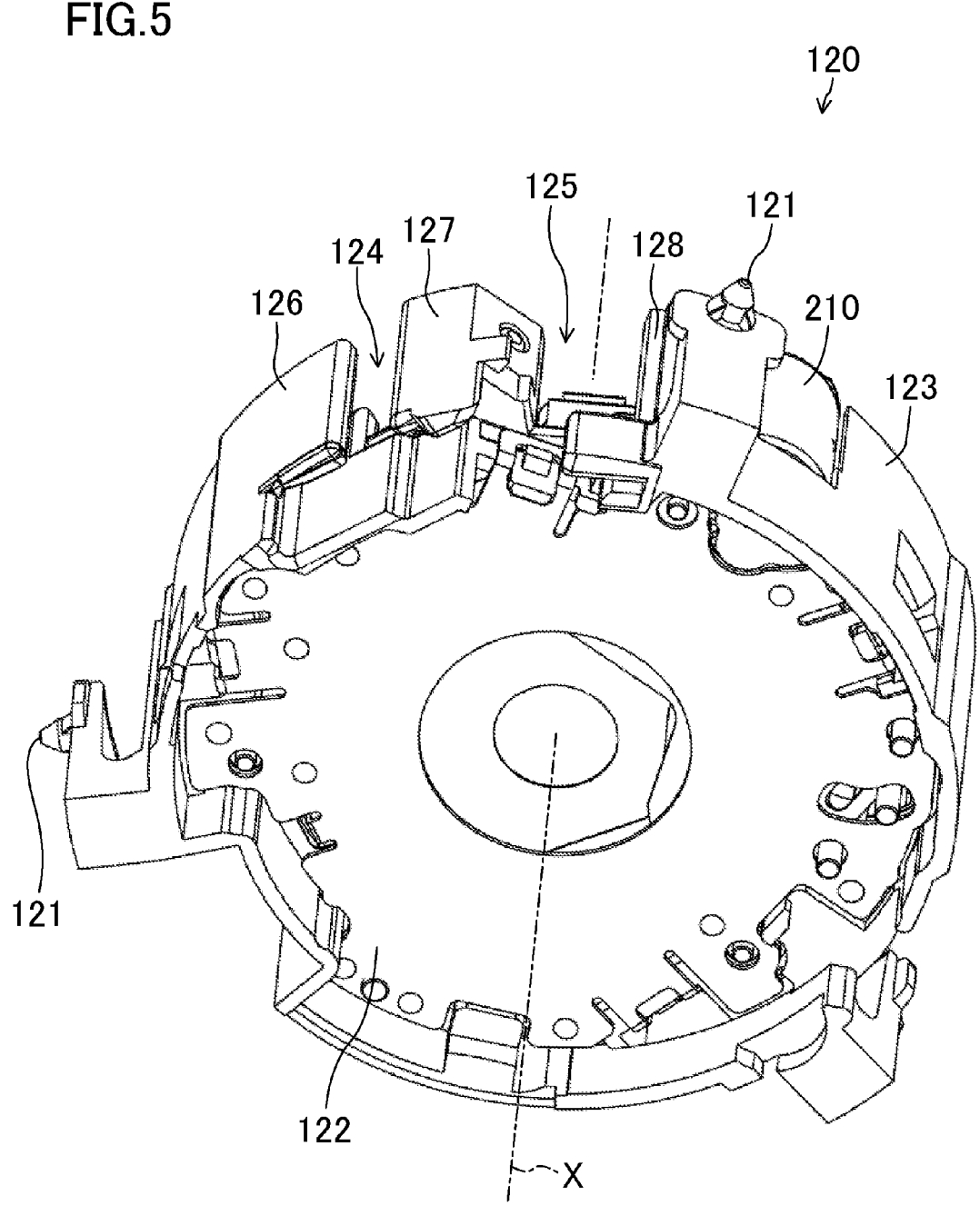
FIG. 5 is a perspective view of the second group frame as viewed from another angle.
Figure 6B:
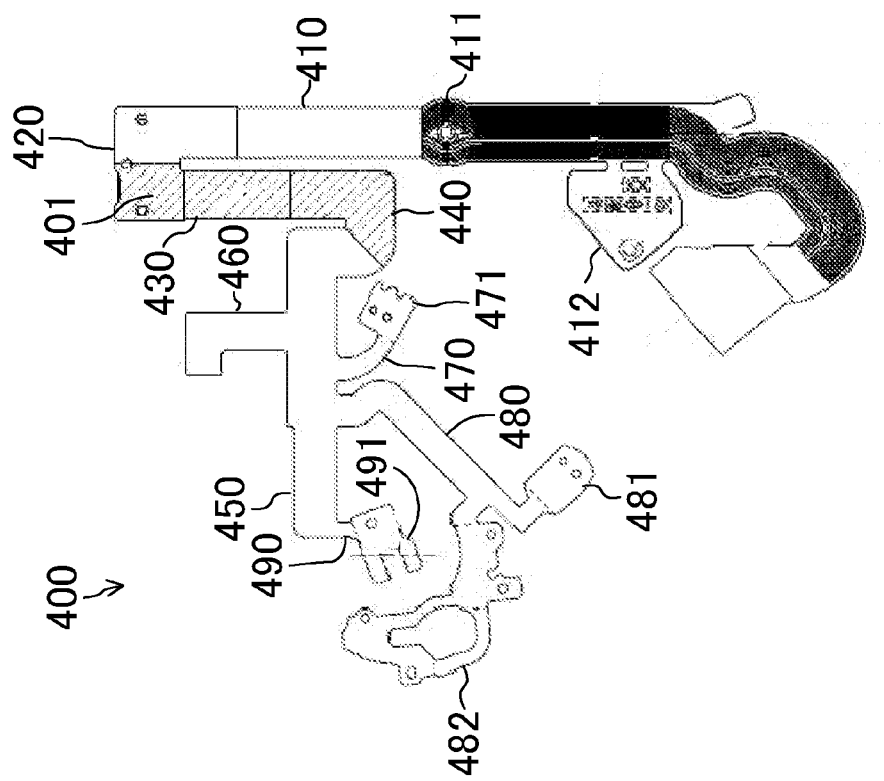
FIG. 6(B) is a bottom view of the flexible cable.
Figure 6A:
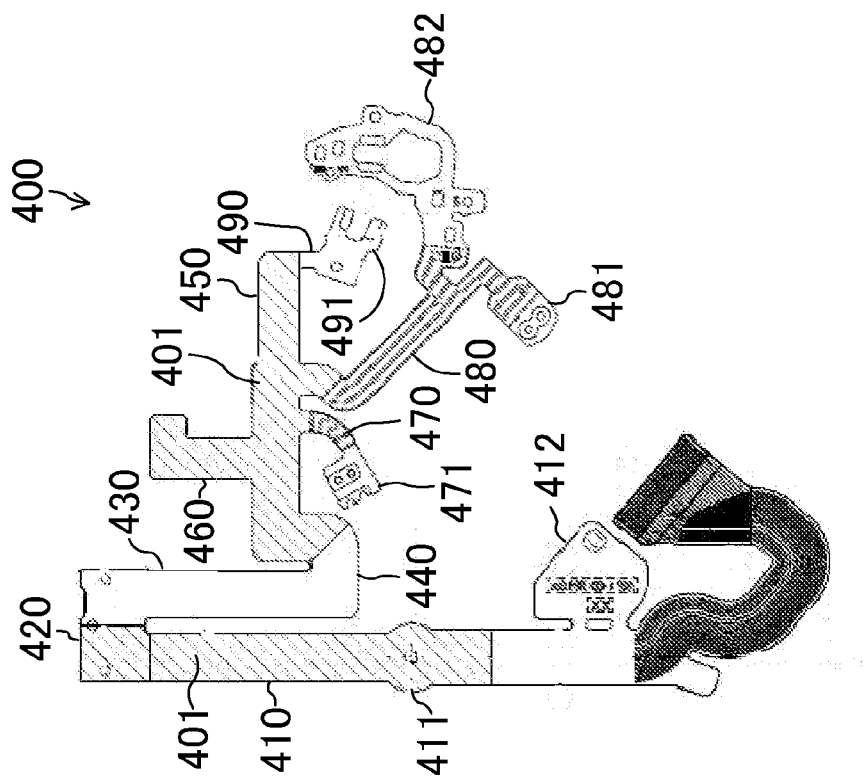
FIG. 6(A) is a plan view of the flexible cable.
Figure 7:
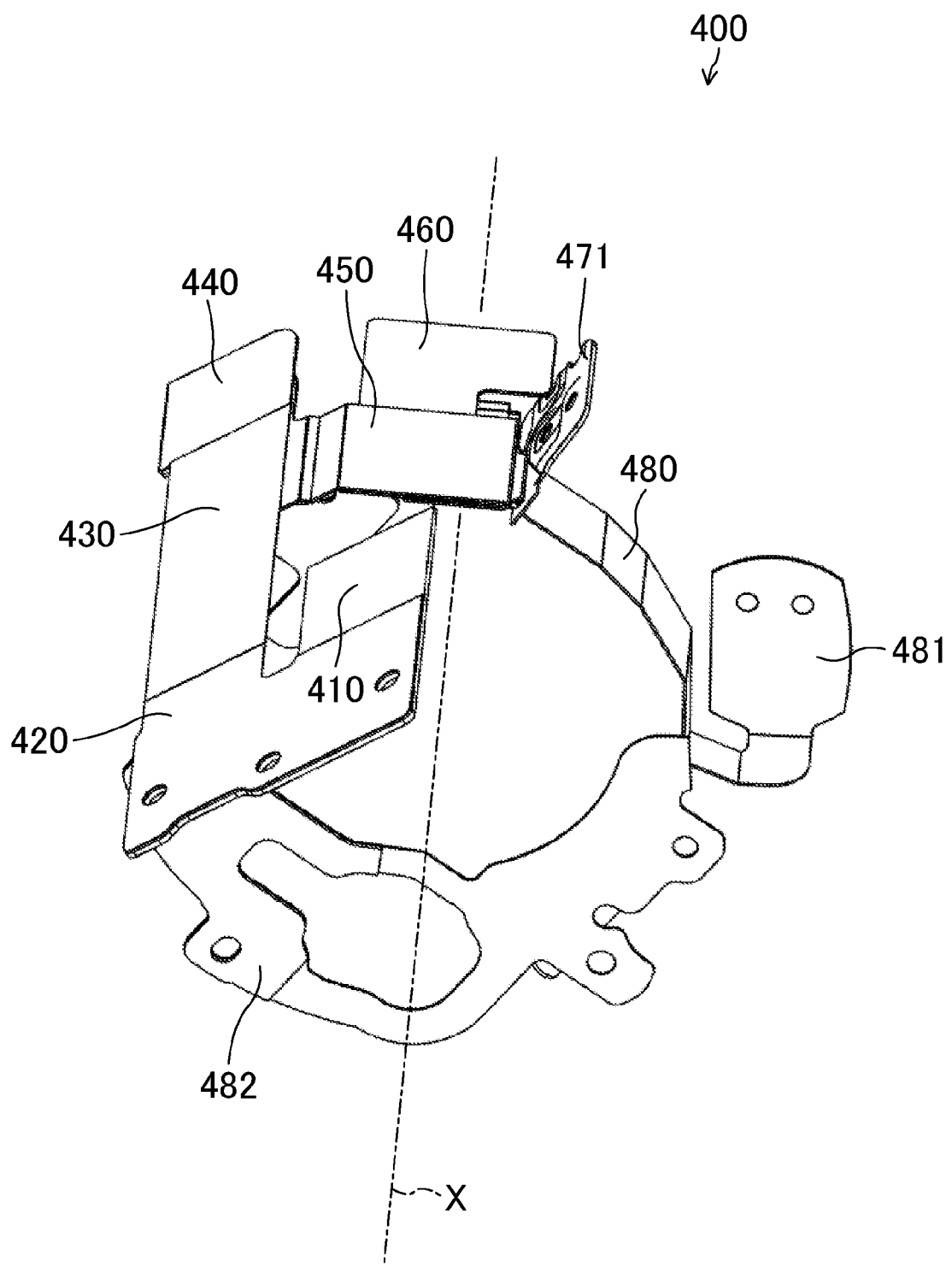
FIG. 7 is a perspective view of the folded flexible cable as viewed from the same angle as that of FIG. 5.
Figure 8:
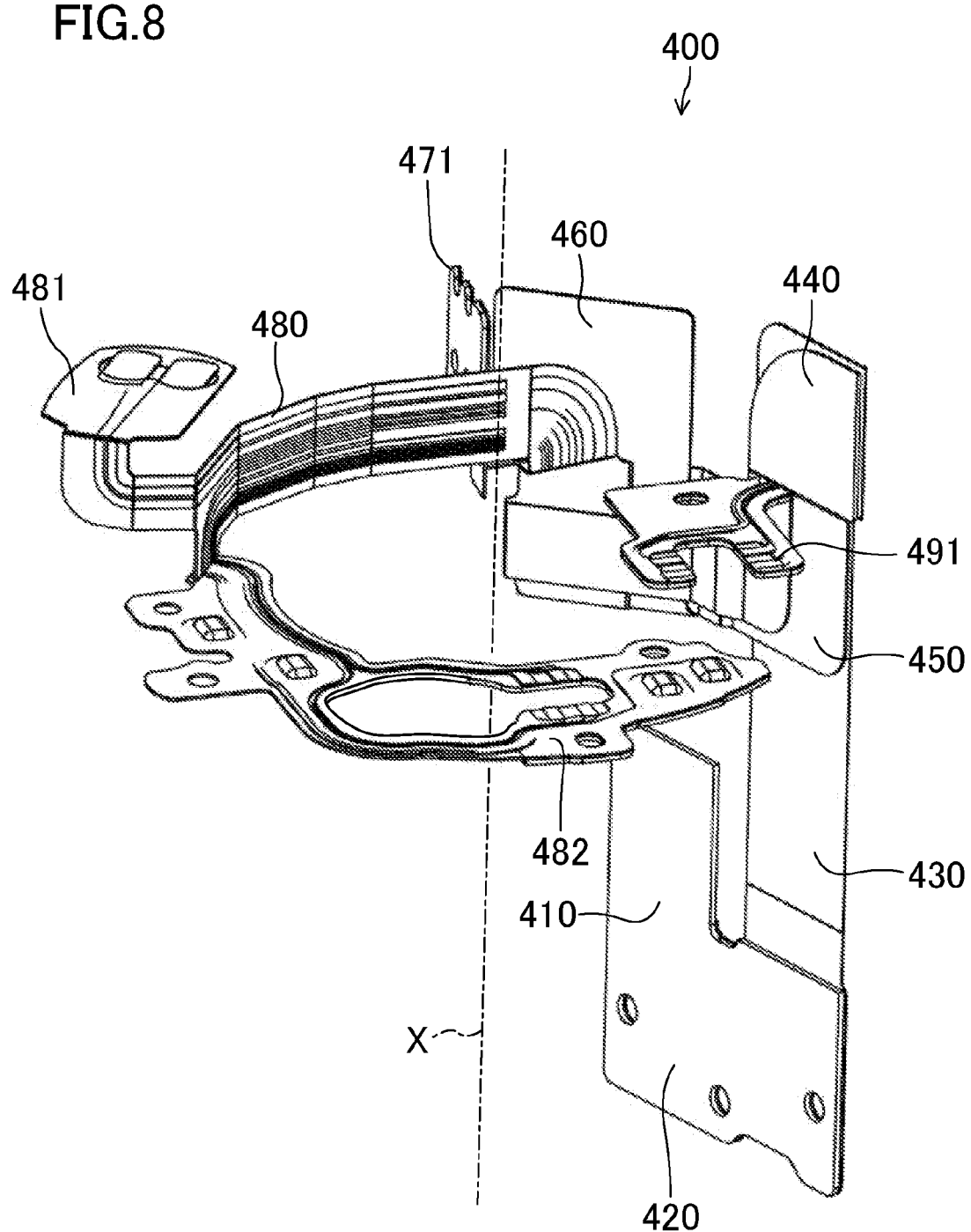
FIG. 8 is a perspective view of the folded flexible cable as viewed from another angle.
Figure 9:
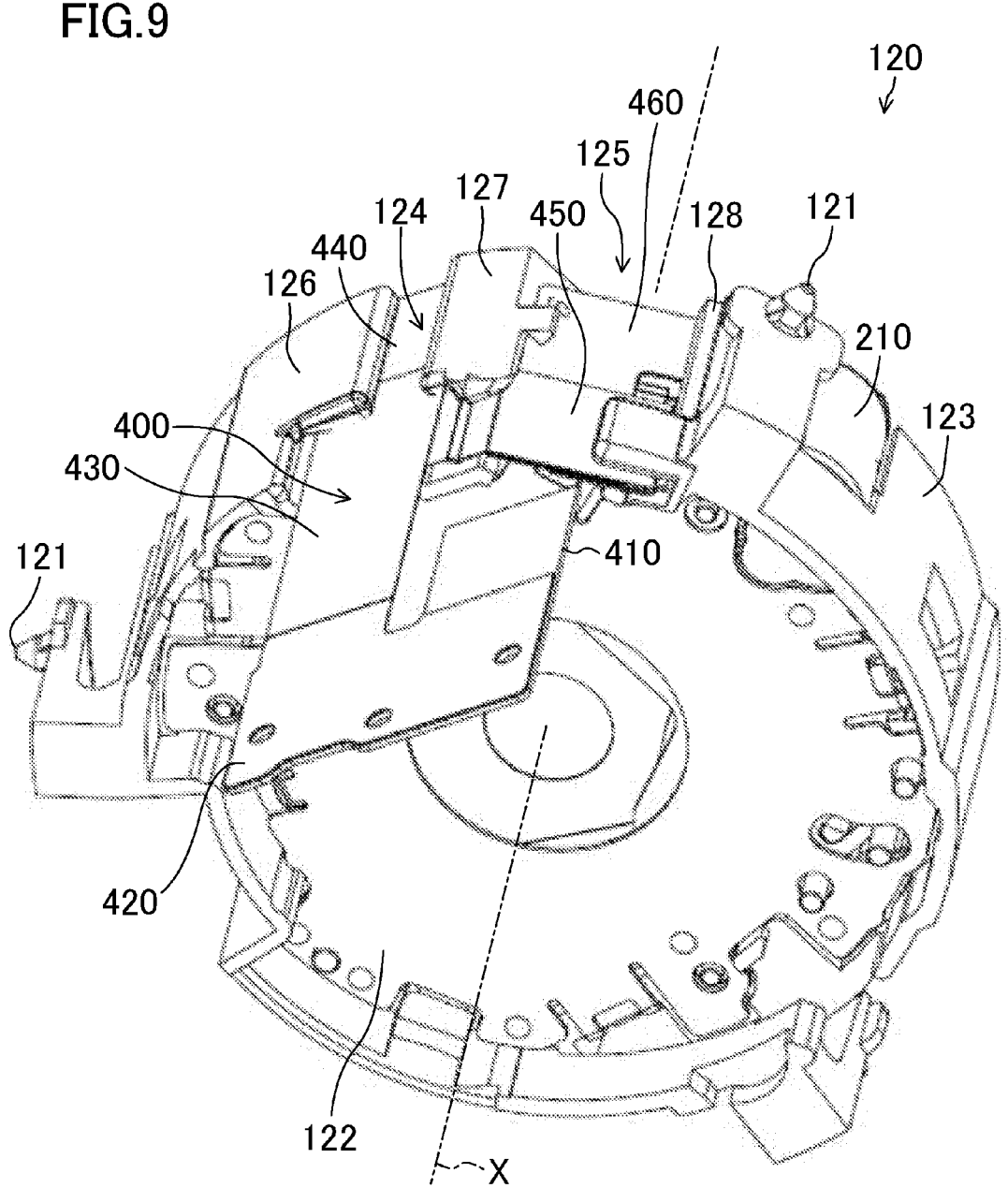
FIG. 9 is a perspective view of the second group frame to which the flexible cable is attached as viewed from the same angle as that of FIG. 5.

Subsequently, a configuration of the second group frame 120 will be described in detail. FIG. 4 is a perspective view of the second group frame 120 to which a flexible cable 400 is attached. FIG. 5 is a perspective view of the second group frame 120 as viewed from another angle. FIG. 6(A) is a plan view of the flexible cable 400, and FIG. 6(B) is a bottom view of the flexible cable 400. FIG. 7 is a perspective view of the folded flexible cable 400 as viewed from the same angle as that of FIG. 5. FIG. 8 is a perspective view of the folded flexible cable 400 as viewed from another angle. FIG. 9 is a perspective view of the second group frame 120 to which the flexible cable 400 is attached as viewed from the same angle as that of FIG. 5.

The second group frame 120 is formed by molding resin such as polycarbonate etc. with a mold. The second group frame 120 includes a discoid portion 122 having an opening at the center, and a cylindrical circumferential wall 123 provided around the discoid portion 122. A most part of the circumferential wall 123 extends from the discoid portion 122 to the object side in the optical axis direction, and the circumferential wall 123 also slightly extends to an imaging surface side in the optical axis direction. The circumferential wall 123 has a function to reduce or prevent a leakage of unnecessary light beams to an outside of the second group frame 120. The second group frame 120 forms a frame.

In the discoid portion 122, a diaphragm mechanism which is one of light amount adjusting units, a shutter mechanism which is one of the light amount adjusting units, and an OIS (optical image stabilizer) mechanism configured to reduce or prevent blurring are provided. In addition to the foregoing, in the discoid portion 122, a diaphragm actuator 210 configured to drive the diaphragm mechanism, a shutter actuator 220 configured to drive the shutter mechanism, and an OIS actuator 230 configured to drive the OIS mechanism are further provided. The diaphragm actuator 210, the shutter actuator 220, and the OIS actuator 230 are arranged on an object-side surface of the discoid portion 122 inside the circumferential wall 123. The diaphragm actuator 210, the shutter actuator 220, and the OIS actuator 230 form electronic components.

The diaphragm actuator 210 includes a motor. The diaphragm actuator 210 operates a turret (not shown in the figure) including a neutral density filter. The shutter actuator 220 includes a motor. The shutter actuator 220 operates a mechanical shutter (not shown in the figure). The OIS actuator 230 includes two pairs of a coil 231 and a magnet (not shown in the figure). The OIS actuator 230 operates an OIS lens (not shown in the figure) in two axis directions which are perpendicular to the optical axis and are perpendicular to each other.

In the second group frame 120, the flexible cable 400 is further provided. The flexible cable 400 is electrically connected to each of the diaphragm actuator 210, the shutter actuator 220, and the OIS actuator 230. The flexible cable 400 transmits power to each of the diaphragm actuator 210, the shutter actuator 220, and the OIS actuator 230.

The flexible cable 400 has a three-layer structure in which copper foil which is a conductive layer is sandwiched between polyimide films. Specifically, the flexible cable 400 is configured as follows: copper foil having a thickness of about 25 µm is formed as a wiring pattern on a base film made of polyimide having a thickness of about 50 µm, and the copper foil is covered by a cover film made of polyimide having a thickness of about 50 µm. The copper foil is patterned into the wiring pattern. In the flexible cable 400, a portion where the copper foil is not provided has a double-layer structure including only the polyimide films.

A first opening 124 and a second opening 125 for an attachment of the flexible cable 400 are formed in the circumferential wall 123 so that the first and second openings 124, 125 are adjacent to each other. The first and second openings 124, 125 are openings through the circumferential wall 123 in a radial direction about the optical axis X. The first opening 124 corresponds to an opening. The flexible cable 400 is pulled out from an inside of the circumferential wall 123 to an outside of the circumferential wall 123 through the first and second openings 124, 125. First to third support portions 126-128 by which the flexible cable 400 is fixed are provided in the circumferential wall 123. Specifically, the second support portion 127 is provided in a portion of the circumferential wall 123 between the first opening 124 and the second opening 125. The first support portion 126 extends in the circumferential direction from a portion of the circumferential wall 123 on an opposite side of the second support portion 127 relative to the first opening 124, and covers a part of the first opening 124. The third support portion 128 is provided in a portion of the circumferential wall 123 on an opposite side of the second support portion 127 relative to the second opening 125.

The flexible cable 400 includes a first linear portion 410, a most part of which linearly extends, a first turnback portion 420 which extends from an end of the first linear portion 410 so as to be turned back in a U-shape, a second linear portion 430 which extends from the first turnback portion 420 in parallel to the first linear portion 410, a second turnback portion 440 which extends from an end of the second linear portion 430 so as to be turned back in the U-shape, a third linear portion 450 which is bent immediately after the turnback part in the second turnback portion 440, and which linearly extends in a direction perpendicular to the second linear portion 430, and first to fourth branched portions 460-490 which are branched from the third linear portion 450. The first to fourth branched portions 460-490 are arranged in this order from a base end (end on the second turnback portion 440 side) to a tip end of the third linear portion 450. The first branched portion 460 is branched from the third linear portion 450 toward the first turnback portion 420, and its tip end portion is bent into a hook. The second branched portion 470 is branched from the third linear portion 450 toward the second turnback portion 440. A first power supply portion 471 through which power is supplied to the diaphragm actuator 210 is provided at a tip end of the second branched portion 470. The third branched portion 480 is branched from the third linear portion 450 toward the second turnback portion 440. A second power supply portion 481 through which power is supplied to the shutter actuator 220, and a third power supply portion 482 through which power is supplied to one of the coils 231 of the OIS actuator 230 are provided at a tip end of the third branched portion 480. The fourth branched portion 490 is branched from the third linear portion 450 toward the second turnback portion 440. A third power supply portion 491 through which power is supplied to the other coil 231 of the OIS actuator 230 is provided at a tip end of the fourth branched portion 490.

An anti-reflection film is provided on a surface of the flexible cable 400. Specifically, an anti-reflection film 401 is provided on the following portions of one of surfaces (surface illustrated in FIG. 6(A)) of the flexible cable 400: a part of the first linear portion 410, a part of the first turnback portion 420 closer to the first linear portion 410, a part of the second turnback portion 440 closer to the third linear portion 450, the third linear portion 450, the first branched portion 460, a base end portion of the second branched portion 470, and a base end portion of the third branched portion 480. On the other hand, the anti-reflection film 401 is provided on the following portions of the other surface (surface illustrated in FIG. 6(B)) of the flexible cable 400: a part of the first turnback portion 420 closer to the second linear portion 430, the second linear portion 430, and a part of the second turnback portion 440 closer to the second linear portion 430. The anti-reflection film 401 is formed of, e.g., a matte black coating.

The second turnback portion 440 of the flexible cable 400 is folded in two so that front and back portions of the second turnback portion 440 relative to the turn are overlapped with each other. In addition, the first branched portion 460 is folded in two in its base end portion so that the tip end portion of the first branched portion 460 is positioned on the same side as the second to fourth branched portions 470-490. Further, the third linear portion 450 is folded in two in a position closer to the tip end of the third linear portion 450 than the portion where the third branched portion 480 is branched from the third linear portion 450 so that front and back portions of the third linear portion 450 relative to the foregoing position are overlapped with each other.

The flexible cable 400 folded as described above is attached to the second group frame 120. Specifically, the second to fourth branched portions 470-490 are placed inside the circumferential wall 123. The folded third linear portion 450 and the folded first branched portion 460 are positioned at the second opening 125, and are sandwiched between each of the second and third support portions 127, 128 and the circumferential wall 123. The folded second turnback portion 440 is positioned at the first opening 124, and is sandwiched between each of the first and second support portions 126, 127 and the circumferential wall 123. The second linear portion 430 is pulled out to the outside of the second group frame 120 through the first opening 124, and extends toward the imaging surface side. The first linear portion 410 and the first turnback portion 420 are also positioned outside the second group frame 120.

That is, the flexible cable 400 is pulled out from an inside of the second group frame 120 to the outside of the second group frame 120 through the first opening 124. In such a state, the first opening 124 is covered by the second linear portion 430 and the second turnback portion 440. In addition, the second opening 125 is covered by the third linear portion 450 and the first branched portion 460.

More specifically, a portion of the folded second turnback portion 440, which is closer to the second linear portion 430 is positioned on an outer side in the radial direction about the optical axis X relative to a portion of the second turnback portion 440 closer to the third linear portion 450. In such a state, the anti-reflection film 401 provided on the second linear portion 430, and the anti-reflection film 401 provided on the part of the second turnback portion 440 closer to the third linear portion 450 face the inside of the circumferential wall 123, i.e., the actuators 210-230. In addition, a base-end-side portion of the folded third linear portion 450 is positioned on the outer side in the radial direction about the optical axis X relative to a tip-end-side portion of the third linear portion 450. In such a state, the anti-reflection film 401 provided on the base-end-side portion of the third linear portion 450 faces the inside of the circumferential wall 123, i.e., the actuators 210-230.

A portion of the flexible cable 400, which is pulled out through the first opening 124 is attached to the master flange 190 via the translational frame 140 and the fixed frame 170. Specifically, as illustrated in FIG. 3, the first turnback portion 420 is attached to the translational frame 140. Subsequently, a first attachment portion 411 provided in the middle of the first linear portion 410 is attached to the fixed frame 170. Then, a second attachment portion 412 of the first linear portion 410, which is provided at an end of the first linear portion 410 on an opposite side of the first turnback portion 420 is attached to the master flange 190.

[3. Advantages of the Embodiment]

The lens barrel 100 of the present embodiment includes the optical imaging system having the optical axis X and forming the optical image of the object; the second group frame 120 including the circumferential wall 123 extending in the optical axis direction; the diaphragm actuator 210, the shutter actuator 220, and the OIS actuator 230 provided in the second group frame 120; and the flexible cable 400 electrically connected to the actuators 210-230. The first and second openings 124, 125 are formed in the circumferential wall 123, and the flexible cable 400 covers at least a part of the first and second openings 124, 125 to block the light passage through the first and second openings 124, 125. This allows the flexible cable 400 to cover a part of the first and second openings 124, 125 even in the configuration in which the first and second openings 124, 125 are formed in the circumferential wall 123 of the second group frame 120, thereby reducing the light leakage through the first and second openings 124, 125.

The flexible cable 400 is pulled out from the inside of the circumferential wall 123 to the outside of the circumferential wall 123 through the first opening 124. This allows the flexible cable 400 electrically connected to the actuators 210-230 to be easily pulled out to the outside of the second group frame 120, thereby improving workability when the flexible cable 400 is attached to the second group frame 120.

The anti-reflection film 401 is provided on at least the actuator 210-230 side surface of the flexible cable 400 in the portion of the flexible cable 400, which covers the opening 124. Specifically, the anti-reflection film 401 is provided on the actuator 210-230 side surface of the flexible cable 400 in the second turnback portion 440. This allows the anti-reflection film 401 to absorb light from the inside of the second group frame 120 to the first opening 124, thereby reducing generation of reflected light from the flexible cable 400.

The anti-reflection film 401 is provided on the actuator 210-230 side surface of the flexible cable 400 in the base-end-side portion of the third linear portion 450 covering the second opening 125. Further, the anti-reflection film 401 is also provided in the tip-end-side portion of the third linear portion 450, which is positioned on the inner side in the radial direction about the optical axis X relative to the base-end-side portion of the third linear portion 450 although the surface on which the anti-reflection film 401 is provided faces the base-end-side portion of the third linear portion 450. This allows the anti-reflection film 401 to absorb light from the inside of the second group frame 120 to the second opening 125, thereby reducing the generation of reflected light from the flexible cable 400.

The wiring pattern is formed in the portion of the flexible cable 400, which covers the first and second openings 124, 125, thereby further reducing the light leakage through the first and second openings 124, 125 by the wiring pattern.

The portion of the flexible cable 400, which covers the first opening 124 is the second turnback portion 440. Thus, in a state in which the flexible cable 400 extends to the object side in the optical axis direction so as to cover the first opening 124 and is turned back, the flexible cable 400 can be pulled out to the imaging surface side in the optical axis direction. This allows the flexible cable 400 to be pulled out to an opposite side of a direction in which the circumferential wall 123 extends in the optical axis direction. For example, in a state in which the flexible cable 400 extends in the direction in which the circumferential wall 123 extends from the discoid portion 122 so as to cover the first opening 124, the flexible cable 400 can be pulled out to the object side in the optical axis direction. That is, depending on whether or not the second turnback portion 440 is provided, the flexible cable 400 can extend to both sides in the optical axis directions regardless of the direction in which the circumferential wall 123 extends. In other words, the circumferential wall 123 can be provided independently of the flexible cable 400, thereby improving a degree of freedom of design of the circumferential wall 123.

The portion of the flexible cable 400, which covers the first opening 124 is folded at least in two. In addition, the portion of the flexible cable 400, which covers the second opening 125 is folded at least in two (folded in four in some locations). Such folded portions further reduces the light leakage through the first and second openings 124, 125.

The flexible cable 400 is sandwiched between each of the first to third support portions 126-128 and the circumferential wall 123 at the first and second openings 124, 125, and the flexible cable 400 is not leant toward the inside of the second group frame 120. As a result, a contact of the flexible cable 400 with the actuators 210-230 can be reduced or prevented.

<<Other Embodiments>>

The foregoing embodiment may have the following configurations.

In the foregoing embodiment, the flexible cable 400 is provided in the second group frame 120, but the present disclosure is not limited to such a configuration. The similar configuration may be employed even in a case where the flexible cable 400 is provided in a frame other than the second group frame 120.

A configuration of the lens barrel 100 is not limited to the foregoing configuration. For example, in the configuration of the lens barrel 100, some frames may be omitted, or further frames may be added.

The circumferential wall 123 provided in the second group frame 120 is in the cylindrical shape, but the shape of the wall is not limited to such a shape. The wall provided in the second group frame 120 is not necessarily in a shape having a closed cross section, such as the cylindrical shape.

The electronic component electrically connected to the flexible cable 400 is not limited to the diaphragm actuator 210, the shutter actuator 220, and the OIS actuator 230, but other electronic components may be electrically connected to the flexible cable 400.

The flexible cable 400 is pulled out from the inside of the circumferential wall 123 to the outside of the circumferential wall 123 through the first opening 124, but may be pulled out to the outside of the circumferential wall 123 through the second opening 125. Alternatively, the flexible cable 400 may be pulled out to the outside of the circumferential wall 123 through both of the first and second openings 124, 125.

The first and second openings 124, 125 are formed in the circumferential wall 123. However, either one of such openings may be formed, or additional openings may be formed.

The flexible cable 400 is pulled out from the second group frame 120 to the imaging surface side through the first opening 124, but may be pulled out to the object side.

A shape of the flexible cable 400 is not limited to the shape employed in the foregoing configuration. Any shapes may be employed as long as the flexible cable 400 is electrically connected to the actuators 210-230, and the flexible cable 400 is pulled out to the outside of the second group frame 120 through the opening formed in the circumferential wall 123 while covering at least a part of the opening.

The flexible cable 400 may cover at least a part of the opening of the circumferential wall 123. The anti-reflection film 401 is not necessarily provided on the portion of the flexible cable 400, which covers the opening, and the wiring pattern is not necessarily formed in such a portion. In addition, the portion of the flexible cable 400, which covers the opening is not necessarily folded in two.

The copper foil is used for the wiring in the flexible cable 400, but metal foil other than the copper foil may be used.

As described above, the present disclosure is useful for the lens barrel.

The description of the embodiments of the present disclosure is given above for the understanding of the present disclosure. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A lens barrel, comprising:
   an optical imaging system having an optical axis and forming an optical image of an object;
   a frame including a wall extending in a direction of the optical axis of the optical imaging system;
   an electronic component provided in the frame; and
   a flexible cable electrically connected to the electronic component,
   wherein an opening is formed in the wall,
   the flexible cable covers at least a part of the opening to block a light passage through the opening, and
   an anti-reflection film is provided on a portion of a flexible cable, which covers the opening, and the anti-reflection film is located on a surface of the portion, which faces the electronic component.

2. A lens barrel, comprising:
   an optical imaging system having an optical axis and forming an optical image of an object;
   a frame including a wall extending in a direction of the optical axis of the optical imaging system;
   an electronic component provided in the frame; and
   a flexible cable electrically connected to the electronic component,
   wherein an opening is formed in the wall,
   the flexible cable covers at least a part of the opening to block a light passage through the opening, and
   the flexible cable contains metal foil, and the metal foil covers the at least a part of the opening.

3. A lens barrel, comprising:
   an optical imaging system having an optical axis and forming an optical image of an object;
   a frame including a wall extending in a direction of the optical axis of the optical imaging system;
   an electronic component provided in the frame; and
   a flexible cable electrically connected to the electronic component,
   wherein an opening is formed in the wall,
   the flexible cable covers at least a part of the opening to block a light passage through the opening, and
   the flexible cable includes a turnback portion, and the turnback portion covers the at least a part of the opening.

* * * * *